United States Patent [19]

Lewin

[11] 3,763,369
[45] Oct. 2, 1973

[54] REFRACTIVE GRID
[75] Inventor: Ian Lewin, Newark, Ohio
[73] Assignee: Holophane Company, Inc., New York, N.Y.
[22] Filed: Nov. 18, 1971
[21] Appl. No.: 200,084

[52] U.S. Cl. ............................................. 240/106
[51] Int. Cl. .............................................. F21v 5/00
[58] Field of Search ................ 240/41.4 R, 41.4 D, 240/92, 93, 106, 106.1

[56] References Cited
UNITED STATES PATENTS

| | | | |
|---|---|---|---|
| 2,434,049 | 1/1948 | Nordquist | 240/93 X |
| 2,542,114 | 2/1951 | Bridge | 240/106.1 |
| 3,288,990 | 11/1966 | Stahlhut | 240/106 R |
| 3,234,376 | 2/1966 | Ceglia | 240/93 X |

Primary Examiner—Fred L. Braun
Attorney—John A. McKinney et al.

[57] ABSTRACT

A refractive grid for use with a luminaire, to counteract glare. The refractive grid comprises a plurality of lenses and screening elements which, jointly, form a mosaic or a pattern covering substantially the entire surface of the refractive grid. Each lens has a concave light incident surface and a convex light emergent surface, the respective radii being constant over the entire refractive grid. Grids are disclosed having a concave incident surface having a radius of curvature generally greater than the convex emergent surface and vice versa. These radii may, however, be essentially indentical, or the convex emergent surface may have a radius of curvature greater than that of the concave incident surface. The screening elements are refractive elements disposed at uppermost extension of the lenses. The construction counteracts any distribution of high-angle light emergent at angles beyond a certain limited angular range.

31 Claims, 35 Drawing Figures

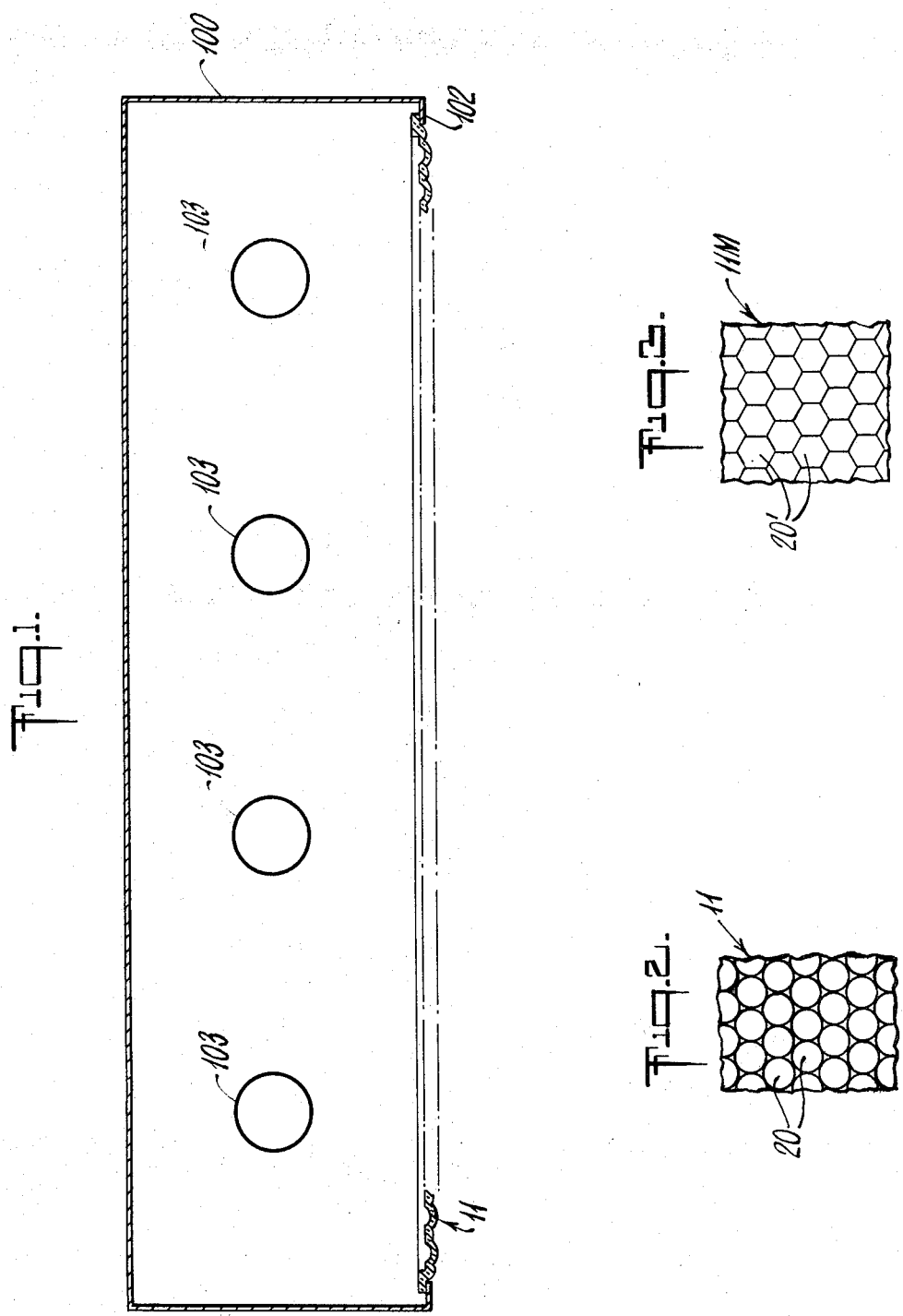

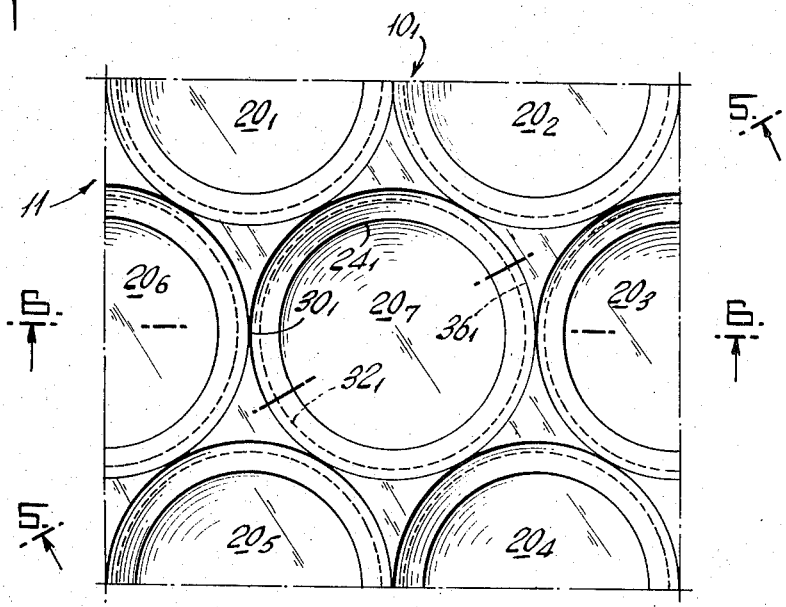
Fig.4.
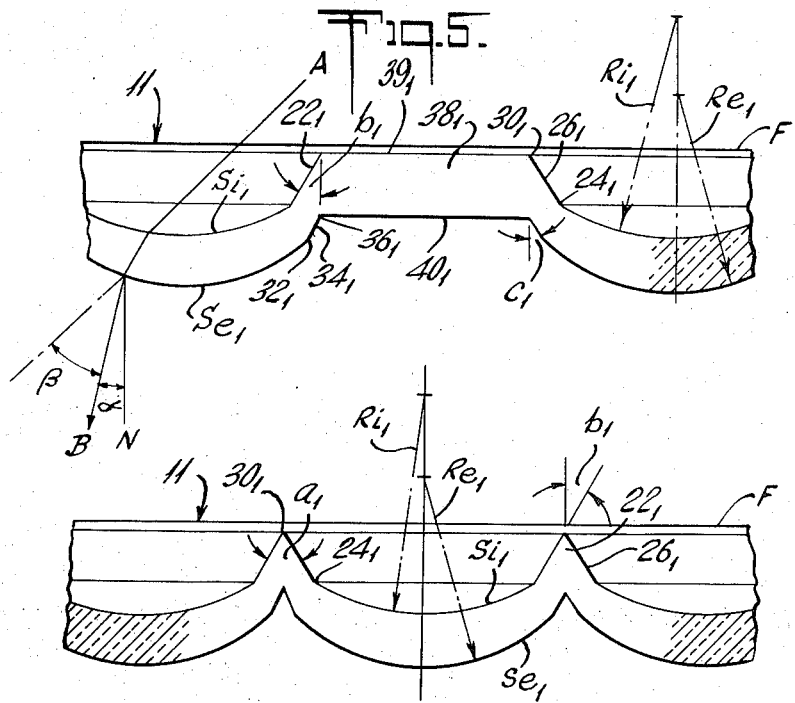
Fig.5.
Fig.6.
INVENTOR
IAN LEWIN

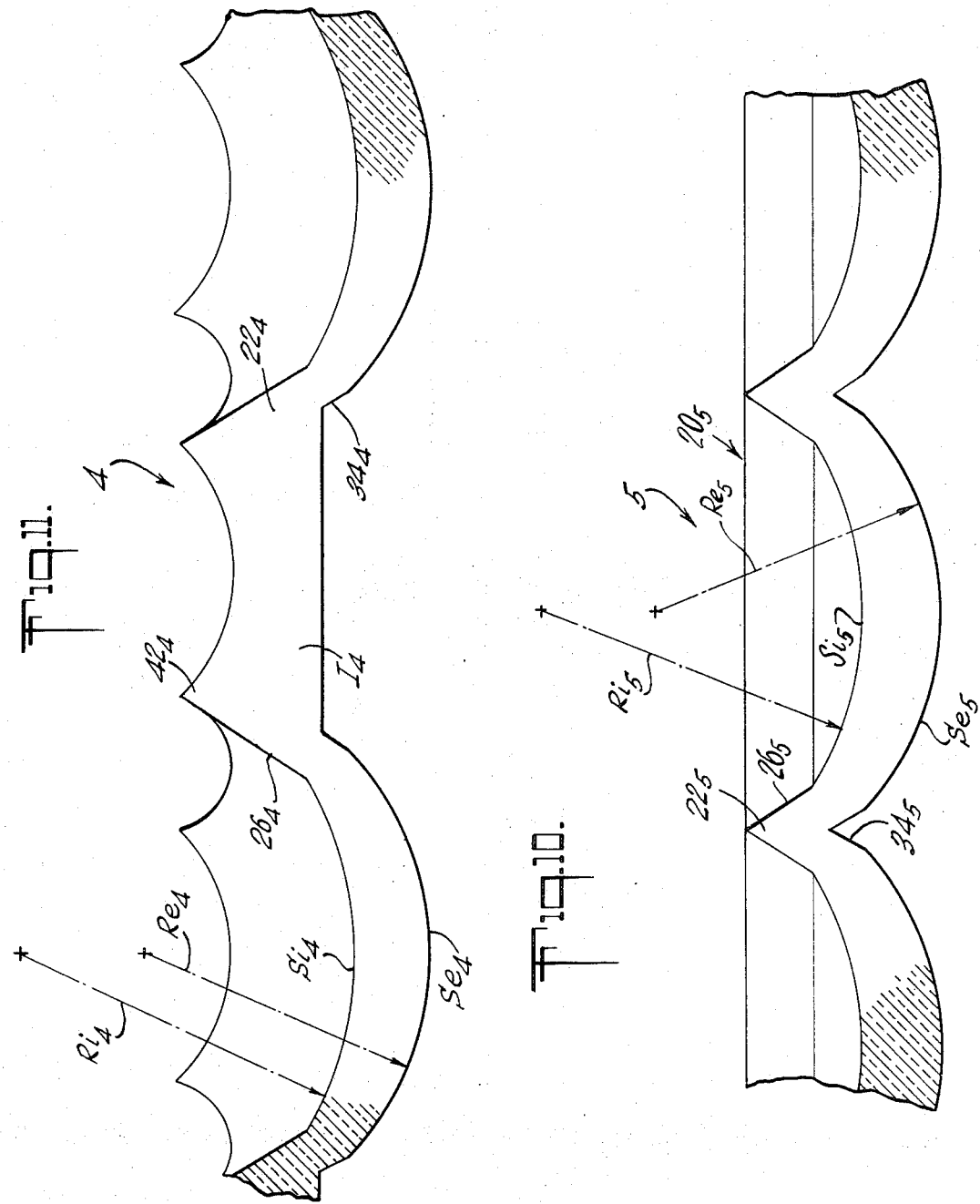

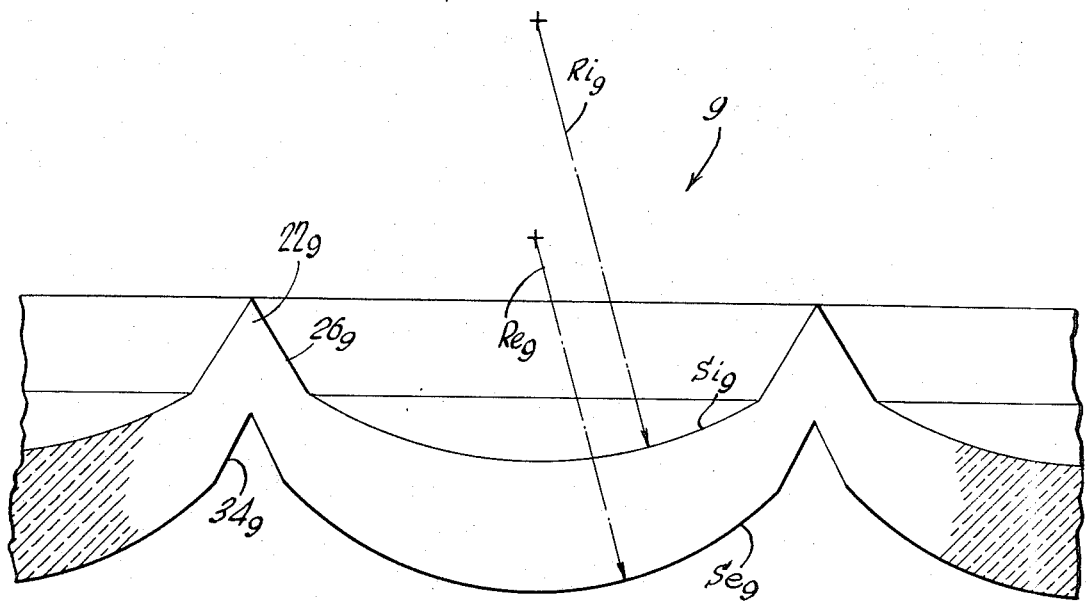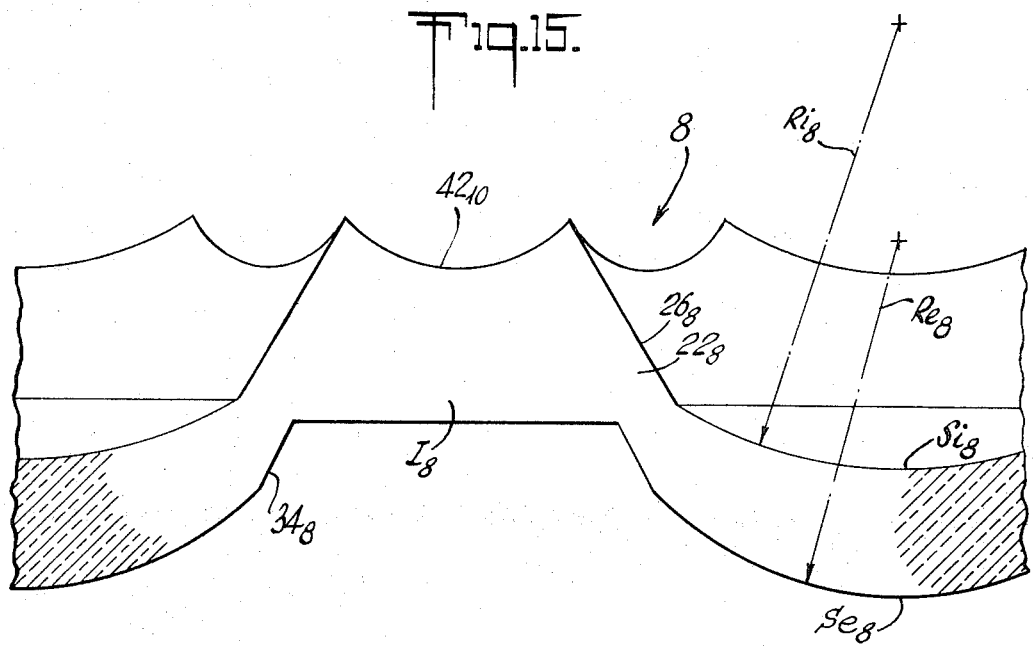

Fig.19B.
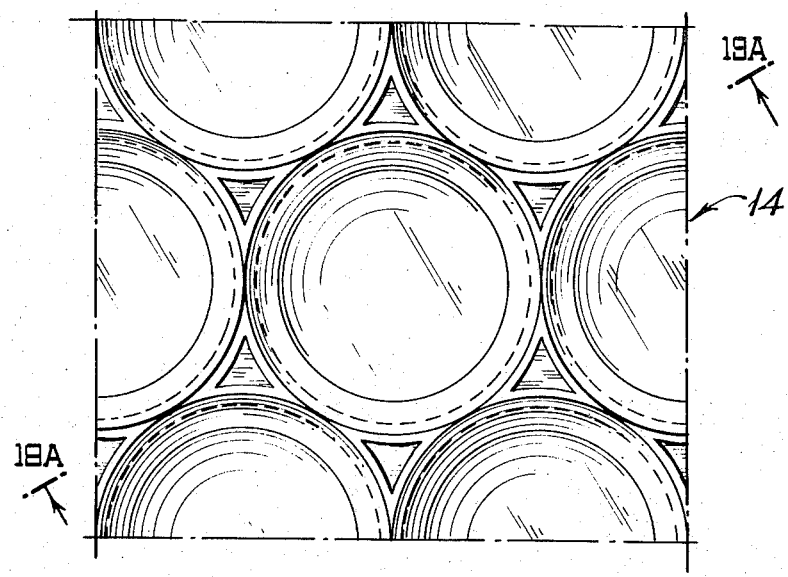
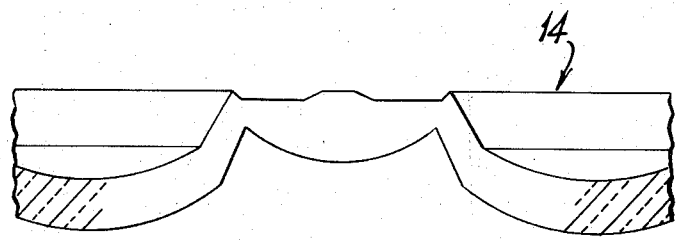
Fig.19A.

INVENTOR
IAN LEWIN

BY Nolte & Nolte
ATTORNEYS

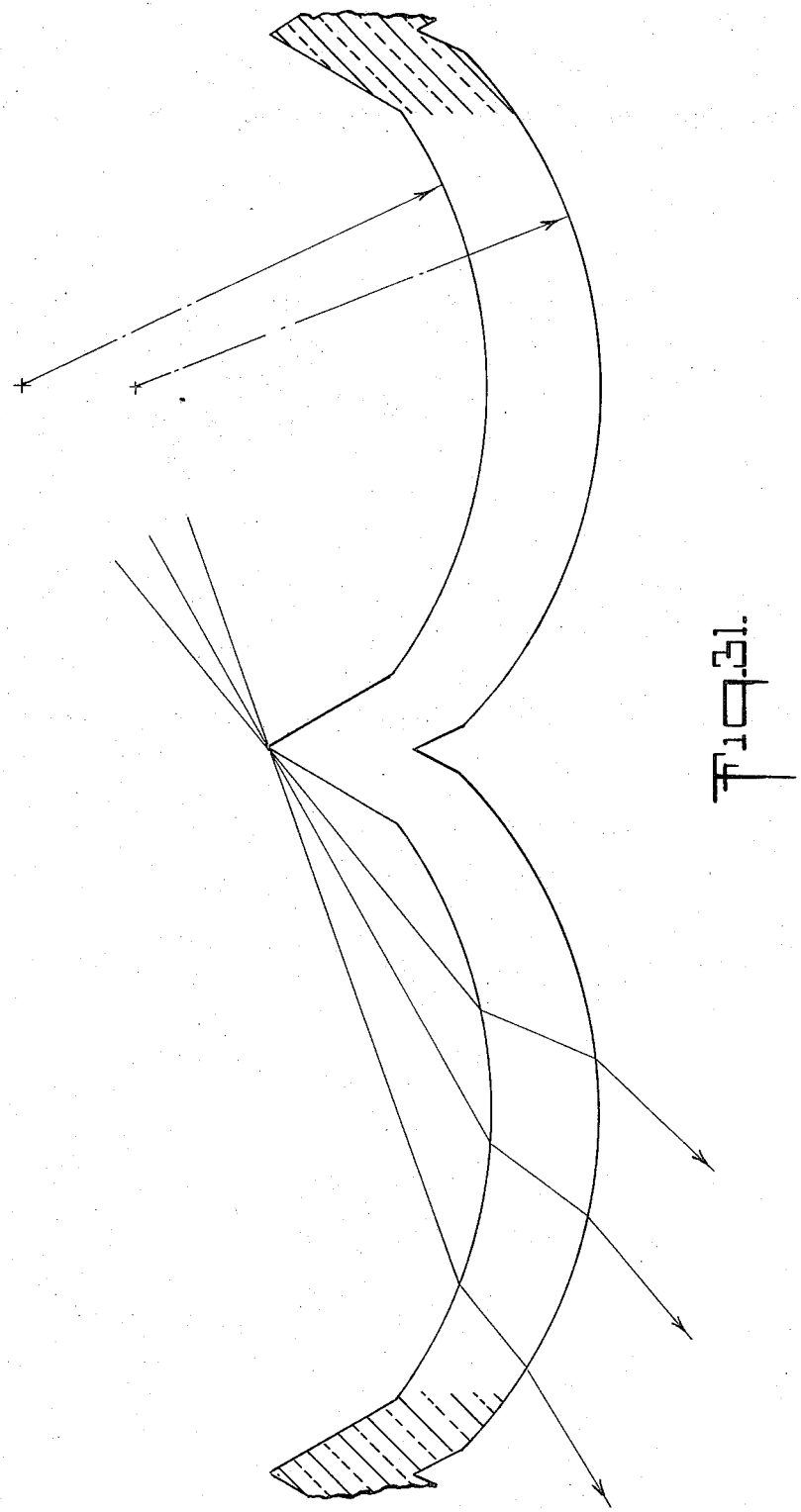

REFRACTIVE GRID

BACKGROUND AND NATURE OF THE INVENTION

Various attempts have been made to counteract the glare or high-angle light of luminaires and thereby to protect the viewer's eyes from strain and fatigue. The most elementary source of glare, direct visibility of the light source to the viewer, has been eliminated by various means, but the constructions thus far employed for such purposes have not been totally successful. One of the reasons is that they, in order to obtain a large reduction in the objectionable high-angle light, invariably required to limit the luminaire's capacity to distribute low-angle or useful light. As a result, compromises were accepted and luminaires were used which only moderately reduced the undesired high-angle light in order to avoid objectionable reduction in the distribution of useful low-angle light.

A related problem of previous luminaires was that they, when installed in parallel rows as usual, inherently directed relatively little light to positions between these rows. This is an additional reason for which, in order to obtain acceptable levels of useful illumination, compromises were accepted in the suppression of glare and additionally, the maximum distance between the rows was restricted.

It should be emphasized that the refractive grid of the invention is applicable to all forms of lighting equipment where control of discomfort glare is required, as it is designed to control light incident from an entire hemisphere. However, a major application of the invention will be in fluorescent lighting where glare control is particularly difficult because of the complex emission of light to be controlled.

It is an object of this invention to provide a refractive grid which overcomes or at least greatly reduces these shortcomings. In particular, the grid is to restrict the amount of light distributed as glare light, while not seriously restricting the amount of usefully distributed light.

It is a more specific object of the invention to substantially reduce the distribution of high-angle light from the luminaire while substantially maintaining the intrinsic capacity of the luminaire to distribute the light within the useful range.

It also is an object of the invention to provide a refractive grid for use with luminaires which, when the luminaires are installed in parallel rows, will distribute light substantially greater in uniformity than that achievable in the past, thereby substantially increasing the allowable spacing between the rows of luminaires.

It is still another object of the invention to substantially reduce the quantity of material required in manufacturing an anti-glare grid for luminaires.

DRAWINGS

FIG. 1 is a diagrammatic sectional view of a luminaire comprising a refractive grid in accordance with the invention;

FIG. 2 is a partial bottom view of the refractive grid of FIG. 1;

FIG. 3 is a similar view of a modified grid;

FIG. 4 is a top plan view of a portion of the refractive grid of FIG. 2, drawn on a larger scale;

FIG. 5 is a sectional elevational view taken along lines 5—5 in FIG. 4;

FIG. 6 is a sectional elevational view taken along lines 6—6 in FIGS. 4 and 4A;

Figure 7:
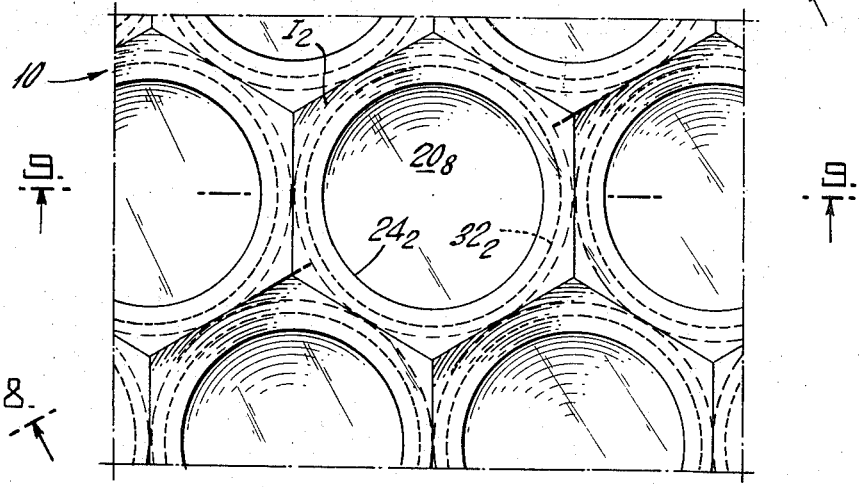
FIGS. 7, 8 and 9 are views similar respectively to FIGS. 4, 5 and 6, but relating to a grid having a modified top surface construction.
Figure 8:
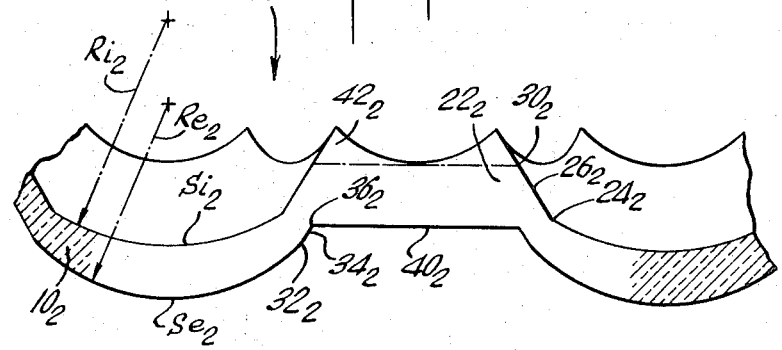
Figure 9:
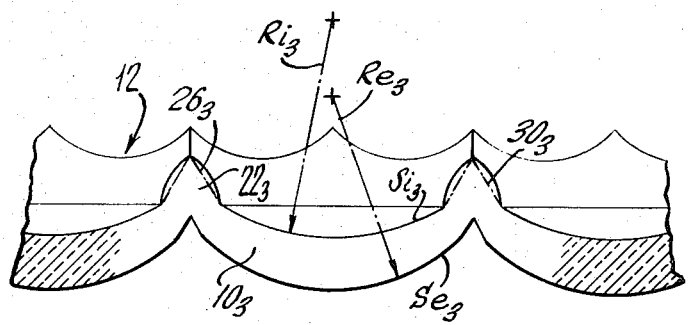
Figure 12:
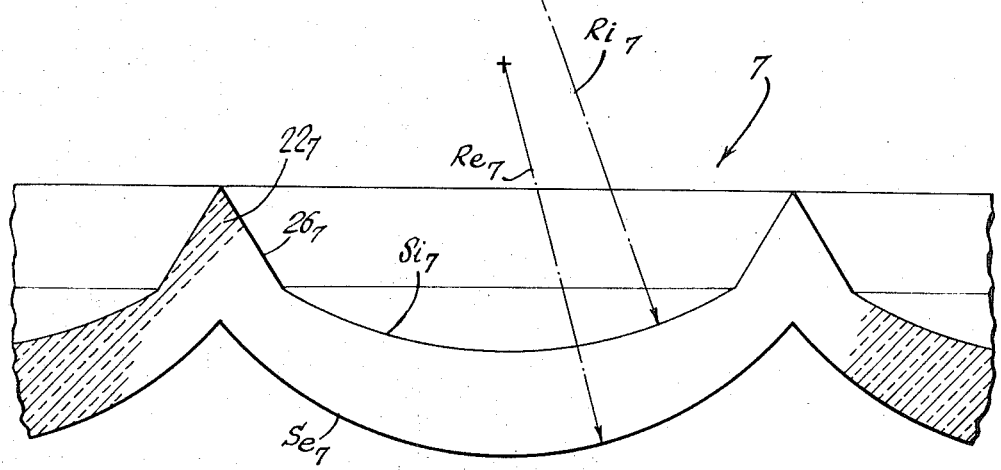
Figure 13:
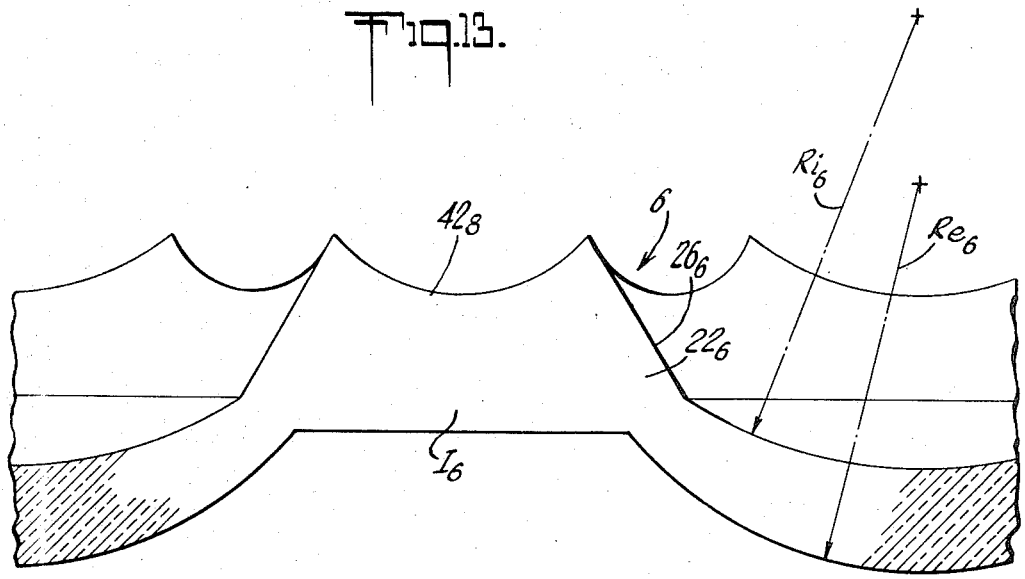

FIG. 9 incorporates further a modification of the grid illustrated by FIGS. 7 and 8, with respect to a detail thereof;

FIGS. 10 and 11 are additional views generally similar to FIGS. 6 and 8 respectively;

FIGS. 12 and 13 are further views generally similar to those of FIGS. 6 and 8 respectively, but each incorporating a further detail modification;

FIGS. 14 and 15 are further views generally similar to those of FIGS. 6 and 8 respectively, but each incorporating a further detail modification;

FIGS. 16 to 19 are still further sectional views taken in similar planes and illustrating still further modifications of certain features;

FIGS. 19A and 19B show sectional and plan views respectively of a still further modification;

FIGS. 20 to 30 are diagrammatic views illustrating the refraction of light rays by a variety of refractive grids according to the invention, some of these views, particularly FIGS. 21 and 24 to 29, showing also reflection of light rays, as will be fully explained hereinafter; and FIG. 31 is a diagrammatic sectional view of yet another modification of the refractive grid of the invention.

REFRACTIVE GRIDS

Figure 16:
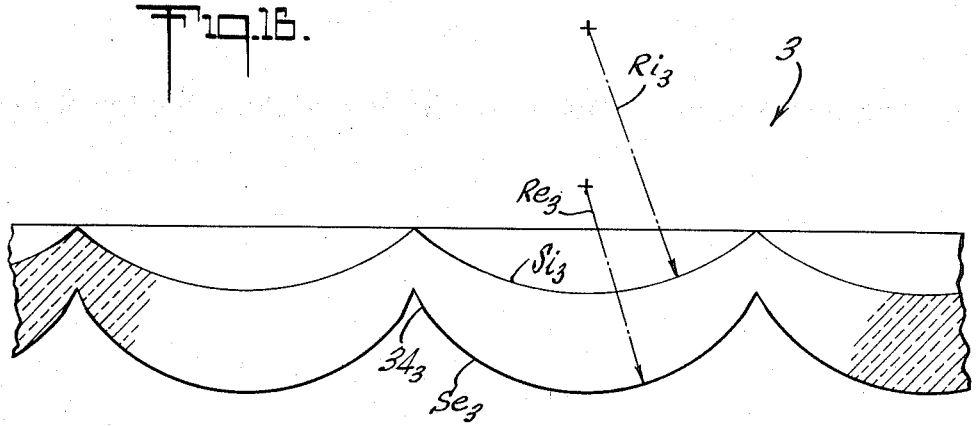
Figure 17:
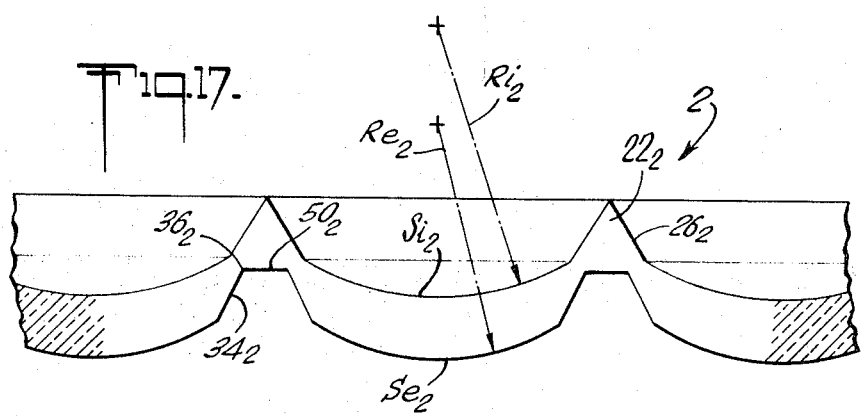
Figure 18:
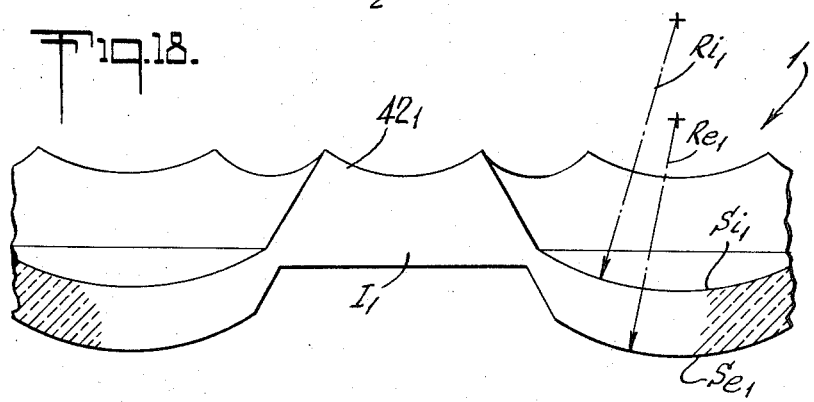
Figure 21:
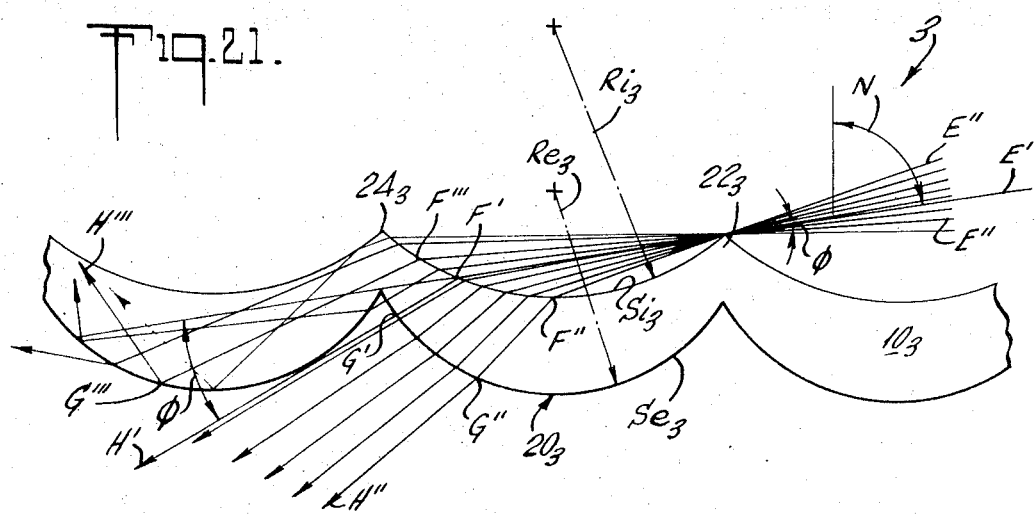

A number of optical tests have been made with a variety of refractive grids produced in accordance with the invention. A number of these grids are correlated with the drawings as follows:

Grids 1, 2 and 3 are illustrated by FIGS. 18, 17 and 16 respectively, the operation of grid 3 being illustrated also by FIG. 21.

Figure 27:
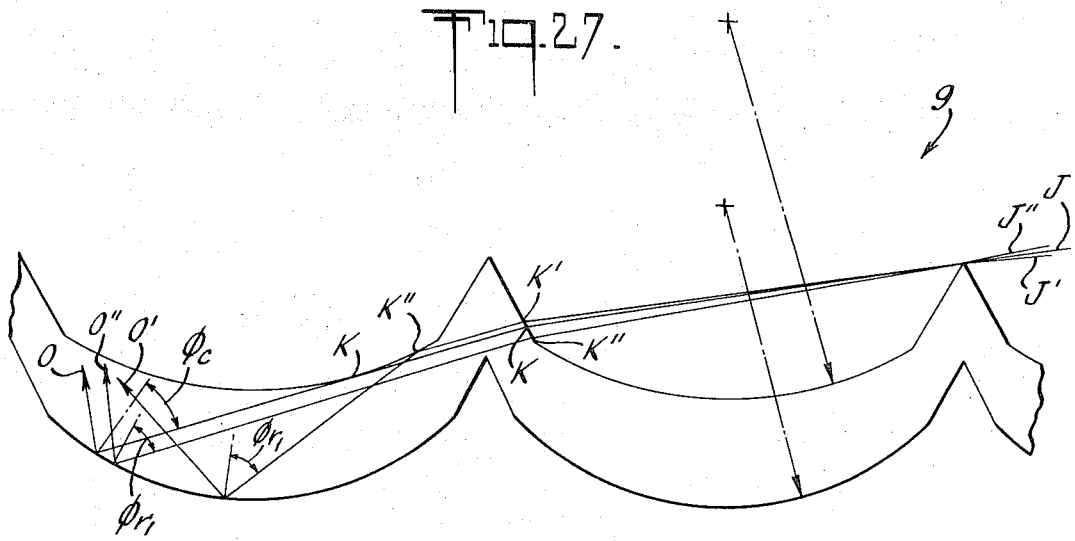

Grids 4, 5, 6, 7, 8 and 9 are illustrated by FIGS. 11, 10, 13, 12, 15 and 14 respectively, an operational feature of the latter being illustrated also in FIG. 27.

Grid 10 is illustrated by FIGS. 7 and 8.

Grid 11 is illustrated by FIGS. 4, 5 and 6 and operative features thereof are additionally illustrated by FIGS. 20, 22 to 26 and 28.

The invention will be described primarily with reference to this grid.

Figure 19:
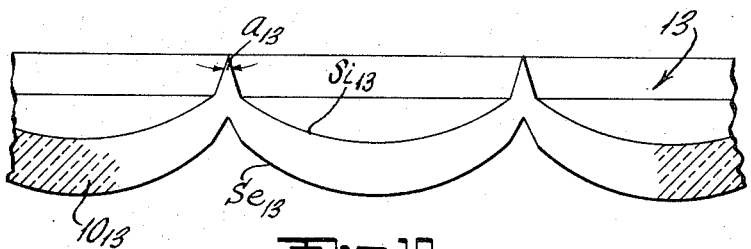

Grids 12 and 13 are illustrated by FIGS. 9 and 19 respectively and grid 14 is illustrated by FIGS. 19A and 19B.

The Grid in General

Referring to FIGS. 1 and 2, luminaire 100 has refractive grid 11, made in accordance with this invention. This grid is held in the bottom part of reflector housing 102 by means known in the art, the reflector housing containing a light source or plurality of light sources 103.

As indicated by FIG. 2, grid 11 comprises an array or mosaic of generally circular lens units 20, occupying the entire area of the bottom of the reflector housing. The grid is made of glass or plastic material known to persons skilled in thie art.

As shown in FIG. 3, a modified grid 11M is composed of an array of hexagonal lens units 20'. In either case, FIGS. 2 and 3, the lens units are regularly distributed over the area of the grid and closely packed for maximum coverage of this area.

Figure 4A:
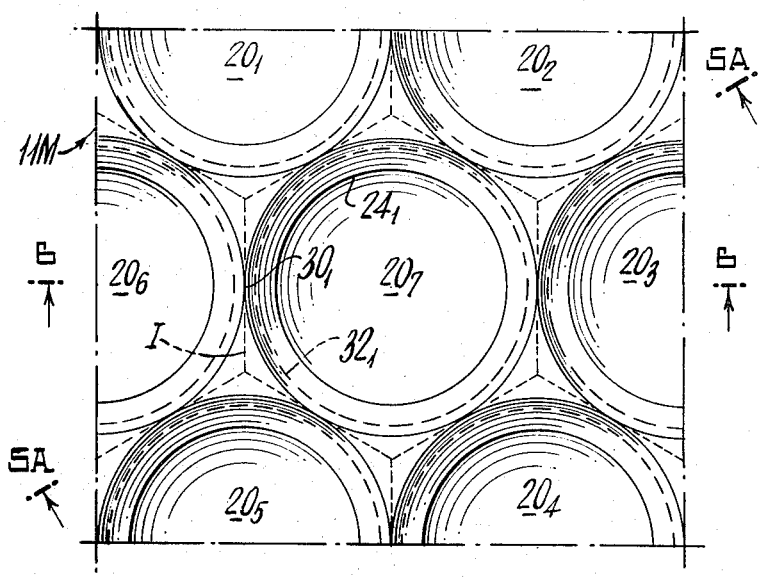
FIG. 4A is a top plan view of a portion of the refractive grid of FIG. 3, drawn on a larger scale.
Figure 5A:
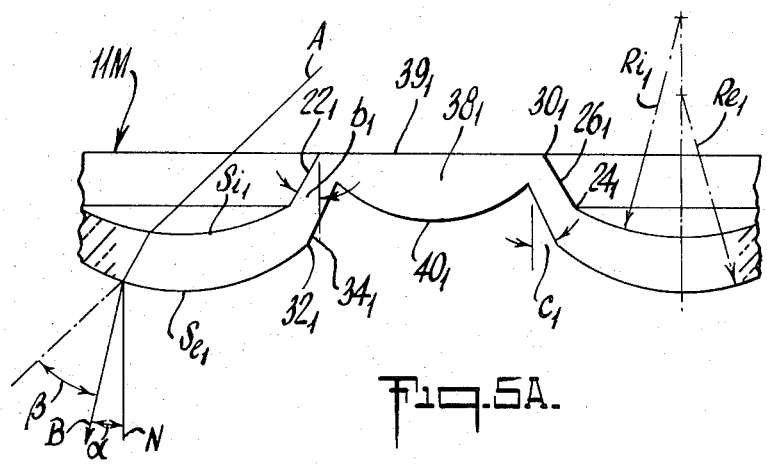
FIG. 5A is a sectional elevational view taken along the line 5A—5A of FIG. 4A.

Construction of Grids 11 and 11M (FIGS. 4 to 6; 4A and 5A):

The lens units 20 of grids 11 and 11M are arranged in form of a regular, hexagonally disposed array of circular lenses $20_1$, $20_2$, etc., down to $20_6$, surrounding central lens $20_7$, and while FIGS. 4 and 4A show only these 7 lenses it will be clear that much larger numbers can and frequently will be provided. They are joined in substantially planar form as shown in FIGS. 5, 5A and 6. Each lens element has a caoncave light incident surface $Si_1$, and a convex light emergent surface $Se_1$. The radii of curvature of these two surfaces, being identified respectively as $Ri_1$ and $Re_1$, are constant over the entire grid surface. In the specific lenses illustrated, the radius of curvature of the light incident surface $Si_1$ is greater than that of the emergent surface. It will be understood that instead of the planar arrangement shown here and in FIG. 1 the grid can also be curved, partly curved, or partly planar, if this be desired for special reasons, in which case it may become necessary to make other adjustments, not considered here but which can be determined readily on consideration of this invention.

In order to prevent the lenses from being struck by high-angle light rays which, even on lowering by the lenses, still are emitted from the refractive grid at too high an angle and would therefore cause unwanted glare, the optical screening elements are provided, which in the present grid are identified as elements $22_1$. They extend upwardly from the uppermost extension $24_1$ of light incident surfaces $Si_1$. These screening elements of grids 11 and 11A shown here, have substantially planar surfaces $26_1$ which are inclined from the vertical by a certain angle $b_1$. The arrangement of these surfaces is such as to establish a generally prismatic element of triangular cross-section (FIG. 6) at each point where two adjoining lenses are directly adjacent one another. On the other hand, the lenses are joined by interstices $38_1$ where they are not directly adjacent one another, these interstices accordingly being of approximately triangular shape, with curved sides, between arcuate peripheral sections of systems of three circular lenses. Top and bottom surfaces of interstice elements $38_1$ are shown in both grid 11 and 11M as having top planar surfaces $39_1$ at the level of the top edges $30_1$ of the prismatic elements $22_1$ (FIGS. 5 and 5A) while the bottom surfaces $40_1$ of these elements 38 are planar in grid 11 and convex in grid 11M, such curvature resulting from the intersection of the bases of the convex emergent surfaces, as indicated at I in FIG. 4A.

Evidently grid 11 can be formed readily from either glass or plastic material by the use of simple die-formed mold structures or other well-known procedures. Homogeneous material is used over the entire area of the refractive grid. The thickness thereof remains approximately uniform over this entire area, and with respect to many common stresses encountered by a grid of this kind, refractive grid 11 is distinctly reinforced by the use of screening elements and lenses, as described, which parts also act as ribs and sections.

The modification of grid 11 in accordance with FIGS. 4A, 5A and 6 will have a partial bottom view as shown in FIG. 3, whereby a hexagon pattern is created on the bottom surface, otherwise the grid being essentially similar to grid 11. This modification may be obtained by means of simple change in the process of manufacture of the device. Choice of circular or hexagonal prisms on the bottom surface will have little effect upon the performance of the device, and either may be used in the formation of any grid described in this specification.

Figure 20:
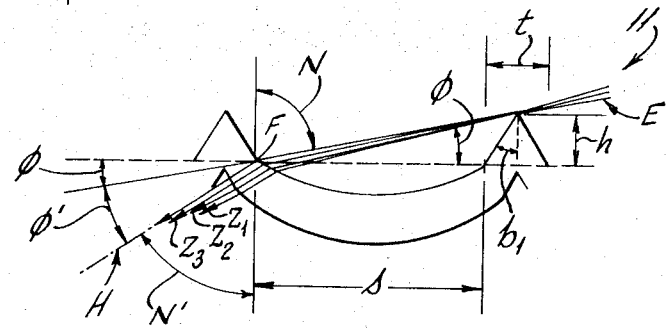

Operation of Grids 11 and 11M (FIGS. 20, 22–26, and 28–30):

FIG. 20 shows the highest angle ray E, which can pass over the screening elements $22_1$ and be directly incident on the light incident concave surface $Si_1$. This ray makes an angle of $\phi°$ with the horizontal. It strikes the lens at an angle of $N°$ from nadir, where $N° = 90° - \phi°$. Lens 20 lowers this high-angle ray by an angle of $\phi'°$, whereby the light ray will be emitted, as H, at an angle of $N'°$ from nadir where $N'° = 90° - \phi° - \phi'°$. Essentially all other light rays which directly strike surface Si, are distributed at angles which are less than or equal to $N'$. By means of preventing emission in the glare zone while allowing emission at angles close to the glare zone, as shown by FIG. 20 ($Z_1$, $Z_2$, $Z_3$), a widespread distribution of light is achieved giving improved uniformity of illumination or wider spacing of luminaires, or both. In this respect, it is noted that Ray $Z_2$ is emitted at a slightly greater angle than H.

At this point, it will be assumed that it is desired, as is usual, to distribute all light from the luminaire at angles $N'$ from 0° to 60° nadir, in order to supress high-angle or glare light that would be distributed at angles between 60° and 90° nadir. Accordingly, elements 22 are optimally designed so that angle $N'$ is at most 60°. This angle $N'$ is a function of the height of the screening element $22_1$, the element thickness, the diameter of the light incident surface $Si_1$, the curvature radius of $Si_1$ and the curvature of $Se_1$. Accordingly, the refractive grid can have substantially different sizes and shapes and can yet obtain the desired light distribution.

Figure 22:
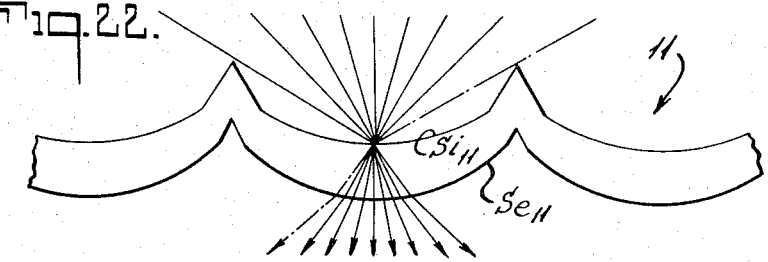

FIG. 22 illustrates the refraction of the family of light rays which strike the light incident surfaces $Si_1$ of the same grid on center. The rays striking on center are either undeviated or lowered. On the other hand, when a family of rays is incident off center (FIG. 23), a portion of the down light (substantially vertical) will be elevated by the lens element. In this connection, angles measured in clockwise direction from nadir will be defined as positive and those measured in counterclockwise direction as negative. Most of the rays are lowered (for example to angle 45° +15°), but down light rays incident at −15° are elevated, while the ray incident at −30° is undeviated. By virtue of this operation, or elevation of some part of the down light, the grid provides a more uniform distribution of the light, within the useful light range, than is generally achieved in conventional grids.

There is a limit to the reduction in the angle of emission of rays of light which can be achieved by the depressing action of the circular lens elements. In this respect, and referring to FIGS. 5 and 20, whereas ray $Z_1$, FIG. 20, will be emitted below 60°, ray $Z_2$ will be emitted at 60°. Had ray $Z_3$ been intercepted by an uninterrupted extension of surface $Se_1$ (FIG. 5), the angle of emission of this ray would have exceeded 60°. For this reason surface $Se_1$ is cut off to a slight extent to provide a planar prism face $34_1$ more acutely inclined to the vertical than the lens surface would be at this location. Thus, ray $Z_3$ is emitted at a lower angle than would be otherwise, below 60°.

Figure 24:
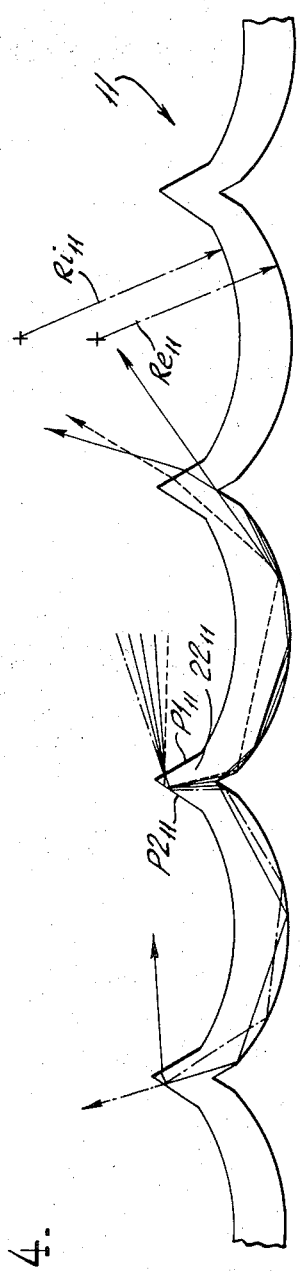

In order to minimize the distribution of undesired high-angle light, it is important that little light or no light should be distributed at higher angles than are illustrated in FIG. 20, although the light from source or sources 103 (FIG. 1) necessarily comes from a wide selection of geometric directions, particularly when this light also is reflected from the inside of reflector 102 as is necessary for efficient operation. In order to minimize the distribution of high-angle light the invention makes considerable use of reflection by the new grid. For example, FIG. 24 shows light incident at high-angles on screen surfaces $P1_{11}$ slightly deviated by refraction and then internally reflected at screen surface $P2_{11}$, whereafter reflected light is further internally reflected on lens and prism surfaces, and ultimately is returned to the inside of the luminaire. As indicated by the drawing, the light has considerable probability of being returned in fairly upright directions and accordingly to be reflected back from the luminaire as down light or in other words, as light of the desired type.

Figure 23:
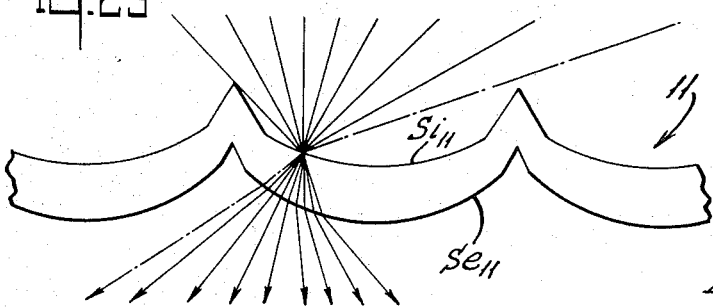

It will be understood that light, instead of being reflected on internal grid surfaces may also be refracted, for example, in the way already shown in FIGS. 20, 22 or 23. In this connection, it will be noted that light internally reflected in main horizontal directions will be subject to total reflection and will accordingly not be distributed from the light emitting surface of the grid shown in FIG. 24.

Figure 25:
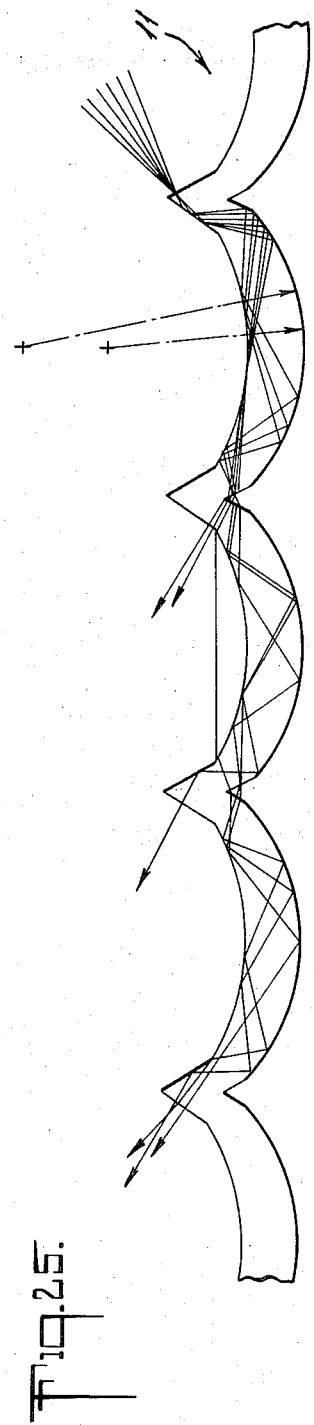
Figure 26:
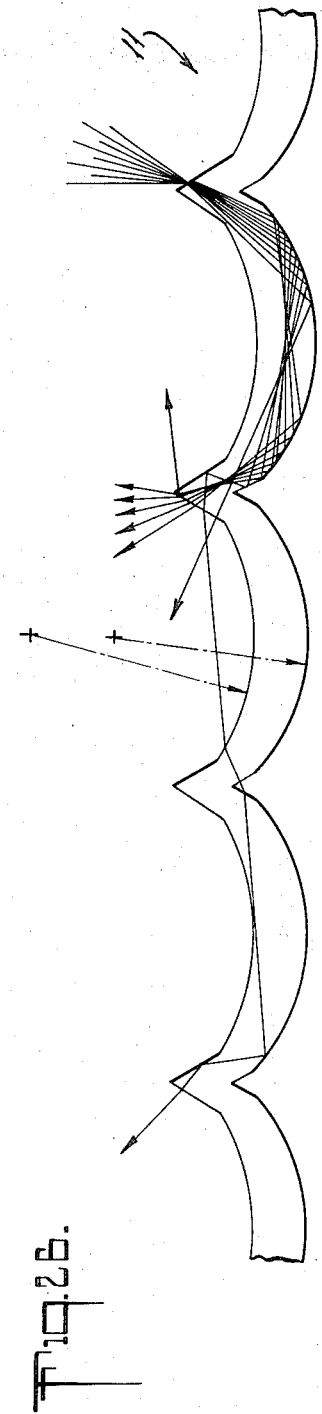

With respect to light incident on the grid in more downward directions, FIGS. 25 and 26, it may be noted in the first place that downward distribution of such light is unobjectionable, and, on the other hand, that the possible internal reflection of such light is harmless. For example, the light rays internally reflected in FIG. 25 are partly refracted downwardly (not shown) and partly internally reflected as indicated, whereby they partly reenter the luminaire, and return as down light. Some parts of the returned light may be incident on the inside of the grid a number of times before they are distributed from the light distributing surface, and it will be understood that substantially no loss is involved in such a process, so long as neither the grid nor the reflector walls of the luminaire are light-absorbent to any high degree. These explanations will also explain the ray traces shown in FIG. 26, where light is incident on the grid at still lower angles to nadir.

Thests were conducted with luminaires having a grid 11. The test results are shown by Table 11 in the group of tables at the end of this description. In the tests the new grid was compared with a conventional cone lens using McPhail prisms (U.S. Pat. No. 2,474,317). The test was conducted by standard routines known to the art, wherein a 2' by 4' Troffer was used. As can be seen from Table 11, the operation of grid 11, in comparison with the operation of the standard cone lens, increased the average candlepower of the luminaire, as to the light emitted within the useful range of 0° to 60°, by 5.7 percent. At the same time, it reduced the undesired light output or glare in the high angle zone of 60° to 90° by as much as 30 percent or more. Evidently this new luminaire is considerably more efficient in distributing useful light and in suppressing undesired glare than the standard equipment.

Construction and Operation of Grid 10 (FIGS. 7 and 8):

In grid 10, composed of an array of hexagonal lens units 20' shown in FIGS. 7 and 8, the cooperation of lenses and optical screen elements is substantially the same as in the basic embodiment described above, except that the top edges of the screen prisms are of somewhat different form and action. Inclined surfaces $26_2$ of the screening elements $22_2$, utilized here, extend upwardly in the interstice regions and define, with similar extensions of adjoining screen elements, what may be called peaks $42_2$ in interstice areas $I_2$. The profile of the grid on the underside thereof is substantially the same as in the preceding embodiment.

Table 10, at the end of this description, gives the results of tests conducted with grid 10 of FIGS. 7 and 8, again using a Troffer with standard cone lens. It will be seen that the results of grids 10 and 11 are almost identical. Grid 10 is still more efficient in the useful range and grid 11 is still more efficient in suppressing glare.

Construction and Operation of Grid 12 (FIG. 9):

A further modification of grid 10 is shown in FIG. 9. Instead of screen surfaces of straight linear form as shown at $30_2$ in FIG. 8 and also at the broken lines $30_3$ in FIG. 9, this further modification uses surfaces of more complex curvature shown at $26_3$, which constitute peaks of outwardly convex curvature in the vertical plane. The modification improves the flow of plastic material during the process of manufacturing the grid and by such improvements to facilitate manufacture of the grid in minimum thickness with resulting saving in material costs, while also minimizing absorption of light. Furthermore, all rays incident upon the second surface of the screening element $22_3$ will be incident at an angle equal to or greater than the critical angle, and thus will be reflected for the most efficient screening. The curvature of the element is generated by construction of the critical angle for a range of rays desired to be screened. As shown by Table 12 this further modification turned out to be approximately equal to the standard equipment as to efficiency of distribution of useful light, but like the other grids discussed thus far, to be vastly more efficient, in the suppression of glare, than the standard equipment.

Construction and Operation of Grids 1 – 9 (FIGS. 10–18, 21 and 27):

Grids 4 and 5 can be described as further, relatively minor modifications of grid 10, described above. In these modified grids (FIGS. 11 and 10 respectively), the dimensions have been increased by a factor of 2. The screen profiles have been formed according to the straight line shape shown in FIG. 9 at $30_3$, not with curvature as shown at $26_3$. The change of absolute dimensions has some effect on the optical behavior, as may be noted from Tables 4 and 5.

The decrease in output of useful light and glare light is due to a large extent to the fact that the light must pass through a greater thickness of plastic.

FIGS. 12 and 13 show respectively grids 7 and 6, the operation of which is shown by the tables bearing respectively the same numbers. Both grids 6 and 7 are characterized by the elimination of the prismatic section $34_5$ of FIG. 10 and other illustrations. Grid 6 shows a top surface construction identical to grid 4, that is, having a haxagonal construction with peaks, while grid 7 has a top surface identical to grid 5, that is, a circular arrangement of prisms. The corresponding tables indicate that the removal of the planar screen sections on the underside causes a slight reduction in the useful light output with little change in the glare output. It will be seen that both grids 6 and 7 show an improvement in the degree of glare control in comparison with that of a standard cone lens, indicating that the major objective of the refractive grid is achieved whether or not the face $34_s$ is present. This indicates that the angle between face $34_s$ and the vertical will effect the extent of the control of light, but that results superior to the cone lens will be achieved for a wide range of angle of face $34_s$, due to the flexibility of the prismatic action of this face.

FIGS. 14 and 15 show, respectively, grids 9 and 8 the results of which are shown by Tables of the latter numbers. In the cases of both grid 9 and 8, the radius of curvature $Se_9$ and $Se_8$ are reduced, relative to $Se_7$. Grids 8 and 9 also show faces $34_8$ and $34_9$ which are increased in size in comparison with face $34_s$ of grid 5. FIG. 15 is characterized by the use of a hexagonal top surface prism with peaks $42_8$, identical to grid 4, while FIG. 14 indicates a top surface configuration identical to grid 5.

Both grids 8 and 9, as indicated by Tables 8 and 9, show an improvement in glare control in comparison to grids 4 and 5. The tables indicate that an alternation of the ratio of the radius of the incident surface to that of the emergent surface of a refractive grid will alter the output and glare characteristics, but still will yield results superior to the cone lens. It may be concluded, therefore, that broad ranges of curvature radii of both incident and emergent surfaces may be used to produce highly satisfactory refractive grids.

Figure 29:
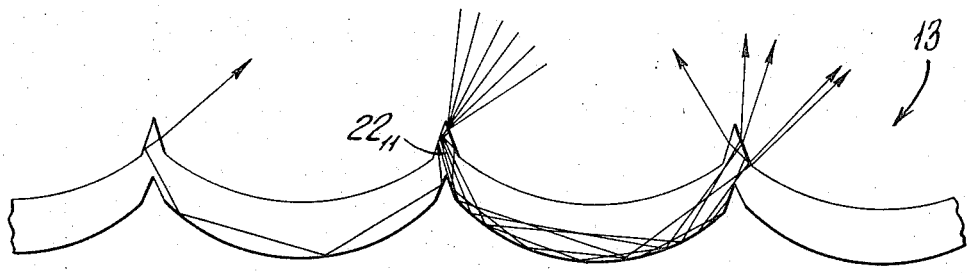
Figure 28:
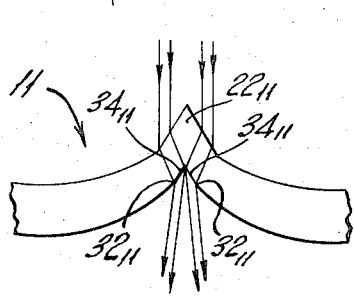
Figure 30:
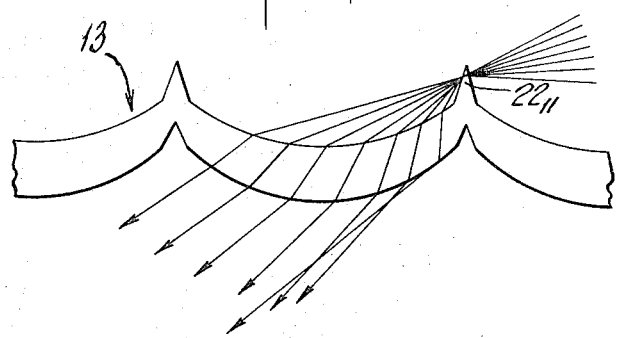

Construction and Operation of Grid 13:

FIG. 19 illustrates a grid 13, and indicates that the screening element of grid 13 is constructed with prism angle $a_{13}$ which is substantially less than the equivalent angles for the screening elements of the previously detailed grids. As indicated by FIG. 30, high angle light incident upon the screening portion does not strike the second surface at a great enough angle to cause reflection, but rather will be refracted, to be emitted after further refraction in the useful light zone. Light striking the same point at low angles, as shown by FIG. 29, will be reflected harmlessly into the fixture. Thus, even though a substantial reduction in the apex angle of the optical screening elements is provided, no light is emitted into the glare zone. This indicates that great flexibility is possible in apex angle of the screening elements, while retaining the basic operational requirements of the device.

The results obtained for grid 13 are listed in Table 13. It will be seen that one of the best optical overall results is obtained by this further embodiment with the understanding, however, that the manufacture of this further grid, with relatively thin material and equally thin screen elements, is likely to be more expensive than the manufacture of the more rugged devices shown above.

Satisfactory results have been shown to result from designs both with and without top surface peaks. A further grid, grid 14, was constructed and tested which had small depressions on the top surface in the shape of arcuate triangles, concentric with the arcuate peripheral sections of the systems of three circular lenses as shown by FIGS. 19A and 19B. Otherwise, grid 14 is identical to grid 11M. This design results in a cheaper process for control, as shown by Table 14.

In summary, it may be noted that with regard to glare control or useful light output or both, all embodiments of the invention analyzed herein show at least some improvement over the standard cone lens. This being the case, and as numerous alterations were introduced in the construction of the respective grids, it will be seen that the design of the grids is extremely flexible. When evaluating the improvement purely in terms of percentage figures, perhaps grids 5, 8 and mainly grids 10 to 14 may be considered the most remarkable ones. As has been noted above, grids 10 and 11 may generally be found to be most satisfactory from the standpoint of optical efficiency as well as mechanical performance with respect to typical operation.

In accordance with the invention, it is desirable to apply to the top surface of the grids a diffusing film such as is indicated by reference F in FIGS. 5 and 6. Applying the film to the refractive grid causes optical contact on the arcuate triangles only, or the top surface peaks, whichever applies, retaining a distance of separation from the main concave light transmitting areas. Thus light transmitted by the grid is diffused before reaching the grid, and the grid mechanism is retained. Tests have shown that glare zone brightnesses are further reduced by the film to a substantially larger extent than the reduction in useful output. This is probably due to the grazing incidence rays on the diffuser, the main source of glare, bring absorbed or scattered preferentially by the diffuser, due to the light path being longer than that encountered by rays incident on the diffuser at low angles which cut across the diffuser via shorter directions.

While the refractive grids above discussed are all constructed with a larger radius of curvature given the incident surface, it is believed that this may not be essential in that it is possible that equal radii for both incident and emergent surfaces or even given a greater radius of the emergent surface will yield results better than the prior art "cone" lens, the depressing action of the rays being achieved by virtue of the offset of points of incidence and emergence. (For example FIG. 21, point F'' and G''.)

FIG. 31 shows that rays will be depressed even if the concave surface does not have a larger radius of curvature than the convex surface.

The performance of the grids, described herein, is summarized in the following Tables.

TABLE 1: Comparison of Standard Cone Lens and Refractive Grid No. 1, in Day-Brite 1' × 4' Troffer

| Angle ° | Average Candlepower for all Planes | | Increase Over Cone Lens |
|---|---|---|---|
| | Cone Lens | Refractive Grid No. 1 | |
| 0 | 1638 | 1506 | −8.0% |
| 5 | 1629 | 1491 | −8.5% |
| 10 | 1606 | 1474 | −8.2% |
| 15 | 1566 | 1430 | −8.6% |
| 20 | 1523 | 1381 | −9.3% |
| 25 | 1470 | 1331 | −9.4% |
| 30 | 1399 | 1278 | −8.6% |
| 35 | 1309 | 1223 | −6.5% |
| 40 | 1196 | 1091 | −8.7% |
| 45 | 976 | 863 | −11.5% |
| 50 | 654 | 595 | −9.0% |
| 55 | 419 | 363 | −13.3% |
| 60 | 251 | 224 | −10.7% |
| 65 | 158 | 138 | −12.6% |
| 70 | 119 | 91 | −23.5% |
| 75 | 90 | 63 | −30.0% |
| 80 | 65 | 36 | −44.6% |
| 85 | 30 | 20 | −33.3% |

| Zone | % Lamp Lumens Cone Lens | Refractive Grid No. 1 | Increase Over Cone Lens |
|---|---|---|---|
| 0°–60° | 52.0% | 47.1% | −9.4% |
| 60°–90° | 4.8% | 3.8% | −20.8% |

TABLE 2: Comparison of Standard Cone Lens and Refractive Grid No. 2, in Day-Brite 1' × 4' Troffer

| Angle ° | Average Candlepower for all Planes Cone Lens | Refractive Grid No. 2 | Increase Over Cone Lens |
|---|---|---|---|
| 0 | 1638 | 1448 | −11.5% |
| 5 | 1629 | 1439 | −11.6% |
| 10 | 1606 | 1419 | −11.6% |
| 15 | 1566 | 1386 | −11.4% |
| 20 | 1523 | 1341 | −11.9% |
| 25 | 1470 | 1287 | −12.4% |
| 30 | 1399 | 1225 | −12.4% |
| 35 | 1309 | 1158 | −11.5% |
| 40 | 1196 | 1047 | −12.4% |
| 45 | 976 | 846 | −13.3% |
| 50 | 654 | 586 | −10.3% |
| 55 | 419 | 346 | −17.4% |
| 60 | 251 | 198 | −21.1% |
| 65 | 158 | 122 | −22.7% |
| 70 | 119 | 80 | −32.7% |
| 75 | 90 | 56 | −37.7% |
| 80 | 65 | 32 | −50.7% |
| 85 | 30 | 17 | −43.3% |

| Zone | % Lamp Lumens Cone Lens | Refractive Grid No. 2 | Increase Over Cone Lens |
|---|---|---|---|
| 0°–60° | 52.0% | 45.5% | −12.5% |
| 60°–90° | 4.8% | 3.3% | −31.2% |

TABLE 3: Comparison of Standard Cone Lens and Refractive Grid No. 3 in Special High Output 2' × 4' Troffer

| Angle ° | Average Candlepower for all Planes Cone Lens | Refractive Grid No. 3 | Increase Over Cone Lens |
|---|---|---|---|
| 0 | 3735 | 3500 | −6.2% |
| 5 | 3715 | 3490 | −6.0% |
| 10 | 3672 | 3466 | −5.6% |
| 15 | 3618 | 3421 | −5.4% |
| 20 | 3549 | 3357 | −5.3% |
| 25 | 3456 | 3263 | −5.5% |
| 30 | 3332 | 3138 | −5.8% |
| 35 | 3160 | 2975 | −5.8% |
| 40 | 2895 | 2726 | −5.8% |
| 45 | 2413 | 2316 | −4.0% |
| 50 | 1556 | 1736 | −11.5% |
| 55 | 1045 | 1158 | −10.8% |
| 60 | 733 | 707 | −3.5% |
| 65 | 538 | 437 | −18.7% |
| 70 | 406 | 320 | −21.1% |
| 75 | 294 | 255 | −13.2% |
| 80 | 201 | 192 | −4.4% |
| 85 | 91 | 133 | −46.1% |

| Zone | % Lamp Lumens Cone Lens | Refractive Grid No. 3 | Increase Over Cone Lens |
|---|---|---|---|
| 0°–60° | 62.3 | 60.4 | −3.0% |
| 60°–90° | 7.8 | 6.9 | −11.5% |

TABLE 4: Comparison of Standard Cone Lens and Refractive Grid No. 4 in Special High Output 2' × 4' Troffer

| Angle ° | Average Candlepower for all Planes Cone Lens | Refractive Grid No. 4 | Increase Over Cone Lens |
|---|---|---|---|
| 0 | 3735 | 3398 | −9.0% |
| 5 | 3715 | 3391 | −8.7% |
| 10 | 3672 | 3367 | −8.3% |
| 15 | 3618 | 3326 | −8.0% |
| 20 | 3549 | 3265 | −8.0% |
| 25 | 3456 | 3185 | −7.8% |
| 30 | 3332 | 3085 | −7.4% |
| 35 | 3160 | 2953 | −6.5% |
| 40 | 2895 | 2731 | −5.6% |
| 45 | 2413 | 2372 | −1.6% |
| 50 | 1556 | 1856 | +19.2% |
| 55 | 1045 | 1251 | +19.7% |
| 60 | 733 | 707 | −3.5% |
| 65 | 538 | 381 | −29.1% |
| 70 | 406 | 192 | −52.7% |
| 75 | 294 | 120 | −59.1% |
| 80 | 201 | 75 | −62.6% |
| 85 | 91 | 37 | −59.3% |

| Zone | % Lamp Lumens Cone Lens | Refractive Grid No. 4 | Increase Over Cone Lens |
|---|---|---|---|
| 0°–60° | 62.3 | 60.6 | −2.7% |
| 60°–90° | 7.8 | 4.7 | −39.7% |

TABLE 5: Comparison of Standard Cone Lens and Refractive Grid No. 5 in Special High Output 2' × 4' Troffer

| Angle ° | Average Candlepower for all Planes Cone Lens | Refractive Grid No. 5 | Increase Over Cone Lens |
|---|---|---|---|
| 0 | 3735 | 3459 | −7.3% |
| 5 | 3715 | 3450 | −7.1% |
| 10 | 3672 | 3424 | −6.7% |
| 15 | 3618 | 3385 | −6.4% |
| 20 | 3549 | 3317 | −6.5% |
| 25 | 3456 | 3222 | −6.7% |
| 30 | 3332 | 3109 | −6.6% |
| 35 | 3160 | 2967 | −6.1% |
| 40 | 2895 | 2751 | −4.9% |
| 45 | 2413 | 2406 | −0.2% |
| 50 | 1556 | 1902 | +22.2% |
| 55 | 1045 | 1323 | +26.6% |
| 60 | 733 | 709 | −3.2% |
| 65 | 538 | 343 | −36.2% |
| 70 | 406 | 160 | −60.5% |
| 75 | 294 | 98 | −66.6% |
| 80 | 201 | 63 | −68.6% |
| 85 | 91 | 31 | −65.9% |

| Zone | % Lamp Lumens Cone Lens | Refractive Grid No. 5 | Increase Over Cone Lens |
|---|---|---|---|
| 0°–60° | 62.3 | 61.6 | −1.1% |
| 60°–90° | 7.8 | 4.3 | −44.8% |

TABLE 6: Comparison of Standard Cone Lens and Refractive Grid No. 6 in Special High Output 2' × 4' Troffer

| Angle ° | Average Candlepower for all Planes Cone Lens | Refractive Grid No. 6 | Increase Over Cone Lens |
|---|---|---|---|
| 0 | 3735 | 3268 | −12.5% |
| 5 | 3715 | 3256 | −12.3% |
| 10 | 3672 | 3251 | −11.4% |
| 15 | 3618 | 3227 | −10.8% |

| | | | |
|---|---|---|---|
| 20 | 3549 | 3178 | −10.4% |
| 25 | 3456 | 3100 | −10.3% |
| 30 | 3332 | 2991 | −10.2% |
| 35 | 3160 | 2853 | −9.7% |
| 40 | 2895 | 2620 | −9.4% |
| 45 | 2413 | 2251 | −6.7% |
| 50 | 1556 | 1750 | +12.4% |
| 55 | 1045 | 1196 | +14.4% |
| 60 | 733 | 681 | −7.0% |
| 65 | 538 | 372 | −30.8% |
| 70 | 406 | 183 | −54.9% |
| 75 | 294 | 106 | −63.9% |
| 80 | 201 | 69 | −65.6% |
| 85 | 91 | 36 | −60.4% |

| Zone | % Lamp Lumens Cone Lens | Refractive Grid No. 6 | Increase Over Cone Lens |
|---|---|---|---|
| 0°–60° | 62.3 | 58.3 | −6.4% |
| 60°–90° | 7.8 | 4.5 | −42.3% |

TABLE 7: Comparison of Standard Cone Lens and Refractive Grid No. 7 in Special High Output 2' × 4' Troffer

| Angle ° | Average Candlepower for all Planes Cone Lens | Refractive Grid No. 7 | Increase Over Cone Lens |
|---|---|---|---|
| 0 | 3735 | 3152 | −15.6% |
| 5 | 3715 | 3171 | −14.6% |
| 10 | 3672 | 3157 | −14.0% |
| 15 | 3618 | 3142 | −13.1% |
| 20 | 3549 | 3089 | −12.9% |
| 25 | 3456 | 3017 | −12.7% |
| 30 | 3332 | 2917 | −12.4% |
| 35 | 3160 | 2780 | −12.0% |
| 40 | 2895 | 2566 | −11.3% |
| 45 | 2413 | 2238 | −7.2% |
| 50 | 1556 | 1774 | +14.0% |
| 55 | 1045 | 1262 | +20.7% |
| 60 | 733 | 770 | +5.0% |
| 65 | 538 | 359 | −33.2% |
| 70 | 406 | 172 | −57.6% |
| 75 | 294 | 91 | −69.0% |
| 80 | 201 | 59 | −70.6% |
| 85 | 91 | 32 | −64.8% |

| Zone | % Lamp Lumens Cone Lens | Refractive Grid No. 7 | Increase Over Cone Lens |
|---|---|---|---|
| 0°–60° | 62.3 | 57.7 | −7.3% |
| 60°–90° | 7.8 | 4.5 | −42.3% |

TABLE 8: Comparison of Standard Cone Lens and Refractive Grid No. 8 in Special High Output 2' × 4' Troffer

| Angle ° | Average Candlepower for all Planes Cone Lens | Refractive Grid No. 8 | Increase Over Cone Lens |
|---|---|---|---|
| 0 | 3735 | 3585 | −4.0% |
| 5 | 3715 | 3591 | −3.3% |
| 10 | 3672 | 3549 | −3.3% |
| 15 | 3618 | 3486 | −3.6% |
| 20 | 3549 | 3417 | −3.7% |
| 25 | 3456 | 3332 | −3.5% |
| 30 | 3332 | 3232 | −3.0% |
| 35 | 3160 | 3099 | −1.9% |
| 40 | 2895 | 2869 | −0.8% |
| 45 | 2413 | 2449 | +1.4% |
| 50 | 1556 | 1777 | +14.2% |
| 55 | 1045 | 1057 | +1.1% |
| 60 | 733 | 569 | −22.3% |
| 65 | 538 | 293 | −45.5% |
| 70 | 406 | 190 | −53.2% |
| 75 | 294 | 142 | −51.7% |
| 80 | 201 | 98 | −51.2% |
| 85 | 91 | 53 | −41.7% |

| Zone | % Lamp Lumens Cone Lens | Refractive Grid No. 8 | Increase Over Cone Lens |
|---|---|---|---|
| 0°–60° | 62.3 | 61.7 | −0.9% |
| 60°–90° | 7.8 | 4.4 | −43.5% |

TABLE 9: Comparison of Standard Cone Lens and Refractive Grid No. 9 in Special High Output 2' × 4' Troffer

| Angle ° | Average Candlepower for all Planes Cone Lens | Refractive Grid No. 9 | Increase Over Cone Lens |
|---|---|---|---|
| 0 | 3735 | 3436 | −8.0% |
| 5 | 3715 | 3420 | −7.9% |
| 10 | 3672 | 3384 | −7.8% |
| 15 | 3618 | 3326 | −8.0% |
| 20 | 3549 | 3248 | −8.4% |
| 25 | 3456 | 3151 | −8.8% |
| 30 | 3332 | 3028 | −8.8% |
| 35 | 3160 | 2892 | −8.4% |
| 40 | 2895 | 2680 | −7.4% |
| 45 | 2413 | 2290 | −5.0% |
| 50 | 1556 | 1677 | +7.7% |
| 55 | 1045 | 991 | −5.1% |
| 60 | 733 | 541 | −29.8% |
| 65 | 538 | 269 | −50.0% |
| 70 | 406 | 176 | −56.6% |
| 75 | 294 | 129 | −56.1% |
| 80 | 201 | 88 | −56.2% |
| 85 | 91 | 45 | −50.5% |

| Zone | % Lamp Lumens Cone Lens | Refractive Grid No. 9 | Increase Over Cone Lens |
|---|---|---|---|
| 0°–60° | 62.3 | 58.0 | −6.9% |
| 60°–90° | 7.8 | 4.0 | −48.7% |

TABLE 10 Comparison of Standard Cone Lens and Refractive Grid No. 10 In Globe 2' × 4' Troffer

| Angle ° | Average Candlepower for all Planes Cone Lens | Refractive Grid No. 10 | Increase Over Cone Lens |
|---|---|---|---|
| 0 | 3302 | 3419 | +3.5% |
| 5 | 3277 | 3405 | +3.9% |
| 10 | 3234 | 3376 | +4.3% |
| 15 | 3170 | 3318 | +4.6% |
| 20 | 3087 | 3226 | +4.5% |
| 25 | 2981 | 3098 | +3.9% |
| 30 | 2851 | 2948 | +3.4% |
| 35 | 2684 | 2746 | +2.3% |
| 40 | 2471 | 2466 | +0.2% |
| 45 | 2122 | 2102 | −0.9% |
| 50 | 1363 | 1664 | +22.0% |
| 55 | 912 | 1172 | +28.5% |
| 60 | 639 | 697 | +9.0% |
| 65 | 468 | 370 | −20.9% |
| 70 | 351 | 206 | −41.3% |
| 75 | 254 | 127 | −50.0% |
| 80 | 174 | 86 | −50.5% |
| 85 | 78 | 42 | −46.1% |

| | % Lamp Lumens Cone Lens | Refractive Grid No. 10 | Increase Over Cone Lens |
|---|---|---|---|
| 0°–60° | 53.9 | 57.1 | +5.9% |
| 60°–90° | 6.8 | 4.8 | −29.4% |

TABLE 11: Comparison of Standard Cone Lens and Refractive Grid No. 11, in Globe 2' × 4' Troffer

| Angle ° | Average Candlepower for all Planes Cone | Refractive | Increase Over Cone |

| Angle ° | Lens | Grid No. 11 | Lens |
|---|---|---|---|
| 0 | 3302 | 3405 | +3.1% |
| 5 | 3277 | 3386 | +3.3% |
| 10 | 3234 | 3354 | +3.7% |
| 15 | 3170 | 3297 | +4.0% |
| 20 | 3087 | 3206 | +3.8% |
| 25 | 2981 | 3083 | +3.4% |
| 30 | 2851 | 2931 | +2.8% |
| 35 | 2684 | 2736 | +1.9% |
| 40 | 2471 | 2461 | −0.4% |
| 45 | 2122 | 2111 | −0.5% |
| 50 | 1363 | 1684 | +23.5% |
| 55 | 912 | 1191 | +30.5% |
| 60 | 639 | 690 | +7.9% |
| 65 | 468 | 358 | −23.5% |
| 70 | 351 | 195 | −44.4% |
| 75 | 254 | 123 | −51.5% |
| 80 | 174 | 83 | −52.2% |
| 85 | 78 | 42 | −46.1% |

| Zone | % Lamp Lumens Cone Lens | Refractive Grid No. 11 | Increase Over Cone Lens |
|---|---|---|---|
| 0°–60° | 53.9 | 57.0 | +5.7% |
| 60°–90° | 6.8 | 4.7 | −30.8% |

TABLE 12: Comparison of Standard Cone Lens and Refractive Grid No. 12, in Globe 2' × 4' Troffer

| Angle ° | Average Candlepower for all Planes Cone Lens | Refractive Grid No. 12 | Increase Over Cone Lens |
|---|---|---|---|
| 0 | 3302 | 3355 | +1.6% |
| 5 | 3277 | 3334 | +1.7% |
| 10 | 3234 | 3298 | +1.9% |
| 15 | 3170 | 3236 | +2.0% |
| 20 | 3087 | 3138 | +1.6% |
| 25 | 2981 | 3010 | +0.9% |
| 30 | 2851 | 2850 | 0.0% |
| 35 | 2684 | 2640 | −1.6% |
| 40 | 2471 | 2343 | −5.1% |
| 45 | 2122 | 1979 | −6.7% |
| 50 | 1363 | 1524 | +11.8% |
| 55 | 912 | 1025 | +12.3% |
| 60 | 639 | 585 | −8.4% |
| 65 | 468 | 336 | −28.2% |
| 70 | 351 | 208 | −40.7% |
| 75 | 254 | 144 | −43.3% |
| 80 | 174 | 98 | −43.6% |
| 85 | 78 | 50 | −35.8% |

| Zone | % Lamp Lumens Cone Lens | Refractive Grid No. 12 | Increase Over Cone Lens |
|---|---|---|---|
| 0°–60° | 53.9 | 54.2 | +0.5% |
| 60°–90° | 6.8 | 4.7 | −30.8% |

TABLE 13: Comparison of Standard Cone Lens and Refractive Grid No. 13, in Globe 2' × 4' Troffer

| Angle ° | Average Candlepower for all Planes Cone Lens | Refractive Grid No. 13 | Increase Over Cone Lens |
|---|---|---|---|
| 0 | 3302 | 3327 | +7.0% |
| 5 | 3277 | 3309 | +9.8% |
| 10 | 3234 | 3281 | +14.5% |
| 15 | 3170 | 3225 | +17.4% |
| 20 | 3087 | 3138 | +16.5% |
| 25 | 2981 | 3019 | +12.7% |
| 30 | 2851 | 2872 | +7.4% |
| 35 | 2684 | 2676 | −3.0% |
| 40 | 2471 | 2416 | −2.2% |
| 45 | 2122 | 2098 | −1.1% |
| 50 | 1363 | 1696 | +24.4% |
| 55 | 912 | 1210 | +32.7% |
| 60 | 639 | 715 | +11.9% |
| 65 | 468 | 380 | −18.8% |
| 70 | 351 | 212 | −39.6% |
| 75 | 254 | 134 | −47.2% |
| 80 | 174 | 89 | −48.9% |
| 85 | 78 | 46 | −41.0% |

| Zone | % Lamp Lumens Cone Lens | Refractive Grid No. 13 | Increase Over Cone Lens |
|---|---|---|---|
| 0°–60° | 53.9 | 56.3 | +4.4% |
| 60°–90° | 6.8 | 5.0 | −26.5% |

TABLE 14: Comparison of Standard Cone Lens and Refractive Grid No. 14, in Globe 2' × 4' Troffer

| Angle ° | Average Candlepower for all Planes Cone Lens | Refractive Grid No. 14 | Increase Over Cone Lens |
|---|---|---|---|
| 0 | 3302 | 3221 | −2.5% |
| 5 | 3277 | 3208 | −2.1% |
| 10 | 3234 | 3181 | −1.6% |
| 15 | 3170 | 3132 | −1.2% |
| 20 | 3087 | 3052 | −1.1% |
| 25 | 2981 | 2934 | −1.6% |
| 30 | 2851 | 2784 | −2.4% |
| 35 | 2684 | 2604 | −3.0% |
| 40 | 2471 | 2386 | −3.4% |
| 45 | 2122 | 2103 | −0.9% |
| 50 | 1363 | 1698 | +24.6% |
| 55 | 912 | 1208 | +24.5% |
| 60 | 639 | 695 | +8.8% |
| 65 | 468 | 348 | −25.6% |
| 70 | 351 | 186 | −47.0% |
| 75 | 254 | 126 | −50.4% |
| 80 | 174 | 88 | −49.4% |
| 85 | 78 | 46 | −41.0% |

| Zone | %Lamp Lumens Cone Lens | Refractive Grid No. 14 | Increase Over Cone Lens |
|---|---|---|---|
| 0°–60° | 53.9% | 55.32% | +2.6% |
| 60°–90° | 6.8% | 4.69% | −31.0% |

What is claimed is:

1. A refractive grid for use with a luminaire having a light source, for reducing the distribution of glare light, while promoting the distribution of other light from the source; said grid comprising a network of generally prismatic, refractive screening means, the surfaces of which generally converge into the luminaire, and an array of other refractive elements, each surrounded by such screening means, for passing and lowering low-angle light from the light source and for reflecting, back into the luminaire, high-angle light from the screening means, said other refractive elements being lenses having concave light incident surfaces and convex light emergent surfaces.

2. The grid according to claim 1, wherein said other refractive elements are generally hexagonal.

3. A grid as claimed in claim 1 in which a planar light diffusing filter is located on the light incident side of said grid.

4. A grid as claimed in claim 1, wherein said concave surfaces have a greater radius of curvature than the said convex surfaces.

5. The grid according to claim 4, wherein said other refractive elements are generally hexagonal.

6. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses, said lenses and screening means further comprising means for causing a portion of the down light incident thereon to emerge at wide angles whereby the width of light distribution is increased.

7. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, the radius of curvature of the light incident surface of each lens being greater than the radius of curvature of the light emergent surface thereof whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses, said lenses and screening means further comprising means for causing a portion of the down light incident thereon to emerge at wide angles whereby the width of light distribution is increased.

8. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses, each of said screening having a light incident surface which comprises means for refractively lowering high-angle light incident thereon.

9. The refractive grid according to claim 8, wherein said network of lenses is substantially planar.

10. A grid as claimed in claim 8 in which a planar light diffusing filter is located on the light incident side of said grid.

11. The refractive grid according to claim 8, wherein said light emergent lens surfaces further comprise means for reflectively redirecting the highest angled light rays which are first refractively lowered by said screening means and which then approximately tangentially, within a lens, pass the light incident surfaces.

12. The refractive grid according to claim 11, wherein said means for redirecting the light comprises means to cause said highest angled light rays to pass surfaces, in the lens elements, at angles substantially equal to or greater than the critical angle.

13. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, the radius of curvature of the light incident surface of each lens being greater than the radius of curvature of the light emergent surface thereof whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses, each of said screening means having a light incident surface which comprises means for refractively lowering high-angle light incident thereon.

14. The refractive grid according to claim 13, wherein said network of lenses is substantially planar.

15. A grid as claimed in claim 13 in which a planar light diffusing filter is located on the light incident side of said grid.

16. The refractive grid according to claim 13, wherein said light emergent lens surfaces further comprise means for reflectively redirecting the highest angled light rays which are first refractively lowered by said screening means and which then approximately tangentially, within a lens, pass the light incident surfaces.

17. The refractive grid according to claim 16, wherein said means for redirecting the light comprises means to cause said highest angled light rays to pass surfaces, in the lens elements, at angles substantially equal to or greater tan the critical angle.

18. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, said concave light incident surfaces having uppermost extensions comprising said screening means, whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses.

19. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, said concave light incident surfaces having uppermost extensions comprising said screening means, the radius of curvature of the light incident surface of each lens being greater than the radius of curvature of the light emergent surface thereof whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses.

20. A refractive grid for use with a luminaire having a light source, for reducing the distribution of high-angle glare light, comprising a plurality of lenses and screening means, adjoining one another as a hexagonal network, each of said lenses including a concave light incident surface opposite said light source and a convex light emergent surface, each of said light incident surfaces having an uppermost extension defining a circle, whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses.

21. A refractive grid for use with a luminaire having a light source, for reducing the distribution of high-angle glare light, comprising a plurality of lenses and screening means, adjoining one another as a hexagonal network, each of said lenses including a concave light incident surface opposite said light source and a convex light emergent surface, each of said light incident surfaces having an uppermost extension defining a circle, the radius of curvature of the light incident surface of each lens being greater than the radius of curvature of the light emergent surface thereof whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses.

22. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, said light incident surfaces having uppermost extensions and said screening means comprising generally prismatic means extending upwardly from said extensions, whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses.

23. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, said light incident surfaces having uppermost extensions and said screening means comprising generally prismatic means extending upwardly from said extensions, the radius of curvature of the light incident surface of each lens being greater than the radius of curvature of the light emergent surface thereof whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses.

24. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses, said screening means further comprising means for internally reflectively lowering high angle light refracted thereby, whereby said lowered light will be further lowered.

25. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, the radius of curvature of the light incident surface of each lens being greater than the radius of curvature of the light emergent surface thereof whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses, said screening means further comprising means internally reflectively lowering high-angle light refracted thereby, whereby said lowered light will be further lowered.

26. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, said light incident surfaces and said light emergent surfaces having uppermost extensions, whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses, said grid further including interstice elements which comprise means for joining the uppermost extensions of said light incident surfaces and of said light emergent surfaces at points where said adjoining lenses do not directly adjoin one another.

27. The refractive grid according to claim 26, wherein said interstice elements are substantially planar.

28. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, said light incident surfaces and said light emergent surfaces having uppermost extensions, the radius of curvature of the light incident surface of each lens being greater than the radius of curvature of the light emergent surface thereof whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses, said grid further including interstice elements which comprise means for joining the uppermost extensions of said light incident surfaces and of said light emergent surfaces at points where said adjoining lenses do not directly adjoin one another.

29. The refractive grid according to claim 28, wherein said interstice elements are substantially planar.

30. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, said screening means comprising peak means which have, in a vertical plane, convex light incident surfaces, whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses.

31. A refractive grid for use with a luminaire having a light source, for reducing the distribution of high-angle glare light, comprising a plurality of lenses and screening means, adjoining one another as a network, each of said lenses including a concave light incident surface opposite said light source and a convex light emergent surface, said screening means comprising peak means which have, in a vertical plane, convex light incident surfaces, the radius of curvature of the light incident surface of each lens being greater than the radius of curvature of the light emergent surface thereof whereby said lenses lower relatively high-angle light incident on their light-incident surfaces, so that such light emerges from their light emergent surfaces at smaller angles from nadir, and the screening means comprising means for preventing light, arriving from the light source at extremely high angles from nadir, from directly striking said lenses.

* * * * *